US012771711B2

(12) United States Patent
Mizushima et al.

(10) Patent No.: US 12,771,711 B2
(45) Date of Patent: Oct. 20, 2026

(54) INFORMATION PROCESSING APPARATUS, METHOD, AND COMPUTER READABLE MEDIUM

(71) Applicant: NEC Corporation, Tokyo (JP)

(72) Inventors: Ryo Mizushima, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 146 days.

(21) Appl. No.: 18/835,576

(22) PCT Filed: Mar. 18, 2022

(86) PCT No.: PCT/JP2022/012543

§ 371 (c)(1),
(2) Date: Aug. 2, 2024

(87) PCT Pub. No.: WO2023/175878

PCT Pub. Date: Sep. 21, 2023

(65) Prior Publication Data

US 2025/0141917 A1 May 1, 2025

(51) Int. Cl.
*H04L 9/40* (2022.01)

(52) U.S. Cl.
CPC ...... *H04L 63/1441* (2013.01); *H04L 63/1433* (2013.01)

(58) Field of Classification Search
CPC ........................ H04L 63/1441; H04L 63/1433
See application file for complete search history.

(56) References Cited

U.S. PATENT DOCUMENTS 11,507,671 B1 * 11/2022 Moritz .................... G06F 21/54
11,574,071 B2 * 2/2023 Carmichael ......... H04L 63/1441
2005/0021294 A1 * 1/2005 Trsar ...................... G16H 50/20 702/183
2009/0077666 A1 * 3/2009 Chen ................. G06Q 10/0631 726/25

(Continued)

FOREIGN PATENT DOCUMENTS

JP 2008-129648 A 6/2008
JP 2015-130152 A 7/2015

(Continued)

OTHER PUBLICATIONS

International Search Report for PCT Application No. PCT/JP2022/012543, mailed on May 31, 2022.

*Primary Examiner* — Stephen T Gundry

(57) ABSTRACT

A measure candidate table includes a plurality of measures and indices indicating the effects of respective measures. A measure compatibility table includes combinations of measures in each of which two or more of the plurality of measures are combined with each other and indies indicating the effects of respective combinations of measures. A measure calculation means plans a measure against an attack used in an attack route by using the measure candidate table and the measure compatibility table. A risk value calculation means calculates, based on an index indicating an effect of a measure and an index indicating an effect of a combination of measures, a risk value of the attack route under an assumption that the planned measure is introduced into a system to be analyzed.

15 Claims, 8 Drawing Sheets

(56) References Cited

U.S. PATENT DOCUMENTS

| | | | | |
|---|---|---|---|---|
| 2014/0270404 | A1* | 9/2014 | Hanna | G06V 40/45 382/116 |
| 2018/0225548 | A1* | 8/2018 | Cao | G05D 1/0246 |
| 2020/0177619 | A1* | 6/2020 | Hadar | H04L 43/026 |
| 2022/0014534 | A1* | 1/2022 | Basovskiy | H04L 63/1433 |
| 2022/0131889 | A1* | 4/2022 | Scheideler | H04L 63/20 |
| 2023/0274005 | A1* | 8/2023 | Haruki | G06F 21/57 726/25 |
| 2024/0281540 | A1* | 8/2024 | Mizushima | G06F 21/577 |
| 2024/0282052 | A1* | 8/2024 | Mizushima | G06T 17/00 |
| 2024/0348640 | A1* | 10/2024 | King-Wilson | H04L 63/1433 |
| 2024/0388597 | A1* | 11/2024 | Ueda | G06Q 50/04 |
| 2024/0396925 | A1* | 11/2024 | Ueda | H04L 63/1425 |
| 2025/0021646 | A1* | 1/2025 | Inokuchi | G06F 21/56 |
| 2025/0036774 | A1* | 1/2025 | Sato | G06F 21/552 |
| 2025/0141910 | A1* | 5/2025 | Ueda | H04L 63/1433 |
| 2025/0181710 | A1* | 6/2025 | Kinoshita | G06F 21/55 |
| 2025/0190582 | A1* | 6/2025 | Mizushima | G06F 21/57 |
| 2025/0238523 | A1* | 7/2025 | Inokuchi | G06F 21/577 |
| 2025/0323928 | A1* | 10/2025 | Crabtree | H04L 63/1433 |

FOREIGN PATENT DOCUMENTS

| | | | |
|---|---|---|---|
| JP | 2016-200991 | A | 12/2016 |
| JP | 2018-077597 | A | 5/2018 |

* cited by examiner

| Measure candidate | Attack means against which measure is effective | Effect | Priority |
|---|---|---|---|
| Measure A | Execute arbitrary code using vulnerability | 0.4 | 0.4 |
| Measure B | XXXX | 0.3 | 0.2 |
| Measure C | YYYY | 0.3 | 0.1 |
| Measure D | ZZZZ | 0.2 | 0.3 |
| Measure E | WWWW | 0.35 | 0.25 |

Fig. 4

| Measure | Possible/ Impossible | Effect | Priority |
|---|---|---|---|
| A, B | Possible | 0.5 | 0.5 |
| A, C | Possible | 0.6 | 0.7 |
| A, D | Impossible | 0.2 | - |
| A, B, C | Possible | 0.8 | 0.2 |
| B, E | Impossible | 0.4 | - |
| ... | ... | ... | ... |

Fig. 5

| Measure | Area | Possible/ Impossible | Effect | Priority |
|---|---|---|---|---|
| A, B | Factory | Possible | 0.6 | 0.5 |
| A, B | Office | Possible | 0.5 | 0.7 |
| A, C | Office | Possible | 0.5 | 0.5 |
| ... | ... | ... | ... | ... |

| | Effect of measure | | | | |
|---|---|---|---|---|---|
| | 0 | 1 | 2 | 3 | 4+ |
| Risk value A | 22 | 0 | 0 | 0 | 0 |
| Risk value B | 25 | 13 | 1 | 0 | 0 |
| Risk value C | 0 | 1 | 4 | 45 | 3 |
| Risk value D | 0 | 0 | 2 | 23 | 4 |
| Risk value E | 0 | 0 | 0 | 31 | 32 |

INFORMATION PROCESSING APPARATUS, METHOD, AND COMPUTER READABLE MEDIUM

This application is a National Stage Entry of PCT/JP2022/012543 filed on Mar. 18, 2022, the contents of all of which are incorporated herein by reference, in their entirety.

TECHNICAL FIELD

The present disclosure relates to an information processing apparatus, a method, and a computer readable medium.

BACKGROUND ART

In recent years, threats of cyber-attacks have not been limited to the fields of ICT (Information and Communication Technology), and damages have also been occurring in the fields of control systems and IoT (Internet of Things). In the case of control systems, in particular, there have been cases where the operation of a critical infrastructure has been jeopardized, such as a case where a power system or a factory is shut down. To cope with such threats of cyber-attacks, it is important to clarify security risks present in a system, implement measures thereagainst, and thereby reduce the risks.

As a related art, Patent Literature 1 discloses an information processing apparatus for supporting the implementation of security measures in a data system. The information processing apparatus disclosed in Patent Literature 1 specifies threats which should be dealt with in the data system, and extracts a security measure against each of the specified threats. The information processing apparatus combines the extracted security measures and thereby generates combination patterns of security measures for the specified threats. The information processing apparatus calculates, for each of such combination patterns, an effect value on the data system under the assumption that the combination pattern is implemented, and selects a specific combination pattern based on the calculated effect values.

CITATION LIST

Patent Literature

Patent Literature 1: Japanese Unexamined Patent Application Publication No. 2015-130152

SUMMARY OF INVENTION

Technical Problem

In Patent Literature 1, when the number of security measures that can be introduced into a system or the like is large, the combination of security measures increases. In that case, the calculation of the effects (effect values) under the assumption that the security measures are introduced also increases, so that the calculation cost and calculation time increase.

In view of the above-described circumstances, an object of the present disclosure is to provide an information processing apparatus, a method, and a computer readable medium capable of planning a plurality of measures introduced into a system without increasing the amount of calculation.

Further, another object of the present disclosure is to provide an information processing apparatus, a method, and a computer readable medium capable of visualizing the effects of planned measures.

Solution to Problem

To achieve the above-described object, as a first aspect, the present disclosure provides an information processing apparatus (first information processing apparatus). The first information processing apparatus includes: analysis result acquisition means for acquiring a result of a risk analysis on a system to be analyzed, including an attack route; measure calculation means for planning a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and risk value calculation means for calculating, based on an index indicating an effect of a measure included in the planned measure and an index indicating an effect of a combination of measures included in the planned measure, a risk value of the attack route under an assumption that the planned measure is introduced into the system to be analyzed.

As a second aspect, the present disclosure provides an information processing apparatus (a second information processing apparatus). The second information processing apparatus includes: measure effect calculation means for calculating, for each of attack routes included in a result of a risk analysis on a system to be analyzed, an effect of a planned measure under an assumption that the planned measure is introduced into the system to be analyzed; and display means for displaying the calculated effect of the measure in association with a risk value of the attack route.

As a third aspect, the present disclosure provides an information processing method. The information processing method includes: acquiring a result of a risk analysis on a system to be analyzed, including an attack route; planning a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and calculating, based on an index indicating an effect of a measure included in the planned measure and an index indicating an effect of a combination of measures included in the planned measure, a risk value of the attack route under an assumption that the planned measure is introduced into the system to be analyzed.

As a fourth aspect, the present disclosure provides an information processing method. The information processing method includes: calculating, for each of attack routes included in a result of a risk analysis on a system to be analyzed, an effect of a planned measure under an assumption that the planned measure is introduced into the system to be analyzed; and displaying the calculated effect of the measure in association with a risk value of the attack route.

As a fifth aspect, the present disclosure provides a computer readable medium. The computer readable medium stores a program for causing a computer to perform processes including: acquiring a result of a risk analysis on a system to be analyzed, including an attack route; planning a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and calculating, based on an index indicating an effect of a measure included in the planned measure and an index indicating an effect of a combination of measures included in the planned measure, a risk value of the attack route under an assumption that the planned measure is introduced into the system to be analyzed.

As a sixth aspect, the present disclosure provides a computer readable medium. The computer readable medium stores a program for causing a computer to perform processes including: calculating, for each of attack routes included in a result of a risk analysis on a system to be analyzed, an effect of a planned measure under an assumption that the planned measure is introduced into the system to be analyzed; and displaying the calculated effect of the measure in association with a risk value of the attack route.

Advantageous Effects of Invention

The first information processing apparatus, the method, and the computer readable medium according to the present disclosure can plan a plurality of measures introduced into a system without increasing the amount of calculation.

Further, the second information processing apparatus, the method, and the computer readable medium according to the present disclosure can visualize the effects of planned measures.

BRIEF DESCRIPTION OF DRAWINGS

FIG. 4 shows an example of a measure candidate table;

FIG. 5 shows an example of a measure compatibility table;

EXAMPLE EMBODIMENT

Figure 1:
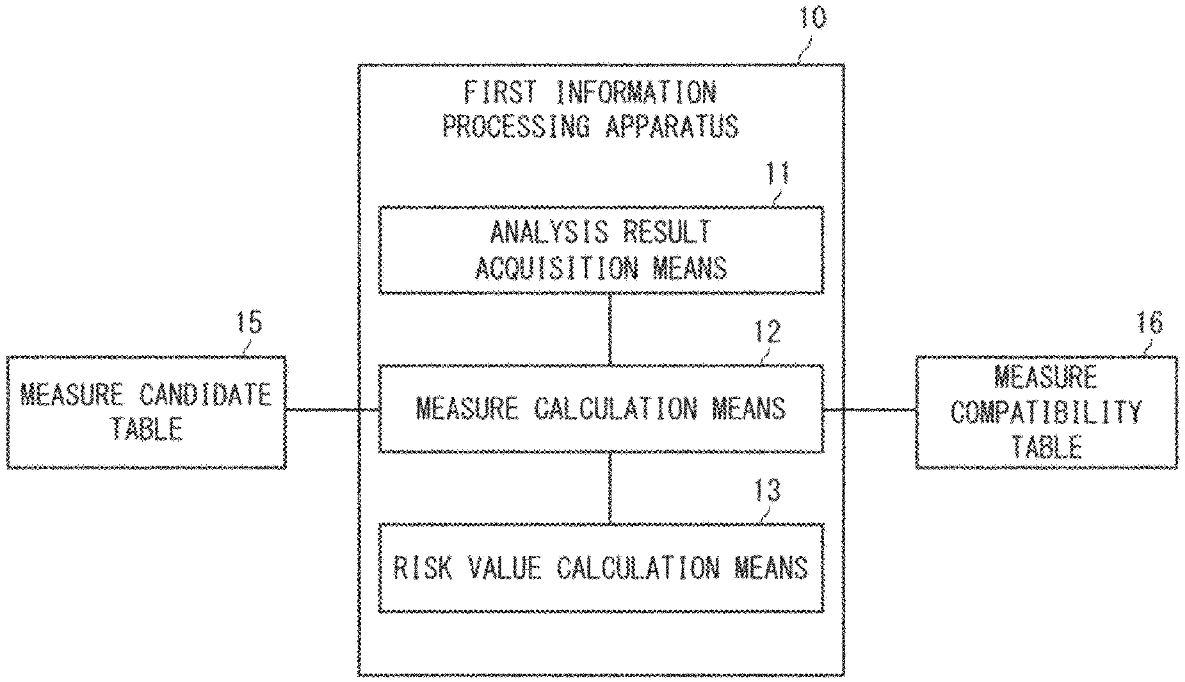
FIG. 1 is a block diagram showing a schematic configuration of an information processing apparatus according to an aspect of the present disclosure.

Prior to describing an example embodiment according to the present disclosure, an outline of the present disclosure will be described. Firstly, a first information processing apparatus according to the present disclosure will be described. FIG. 1 shows a schematic configuration of the first information processing apparatus. The first information processing apparatus 10 includes analysis result acquisition means 11, measure calculation means 12, and risk value calculation means 13. The first information processing apparatus 10 can function as an apparatus that supports the planning of security measures.

The analysis result acquisition means 11 acquires the result of a risk analysis on a system to be analyzed. The result of the risk analysis includes attack routes. The measure calculation means 12 plans measures against attacks used in the attack routes included in the result of the risk analysis by using a measure candidate table 15 and a measure compatibility table 16. The measure candidate table 15 includes a plurality of measures that can be introduced against attacks and indices indicating the effects of the respective measures. The measure compatibility table 16 includes combinations of measures in each of which two or more of the plurality of measures are combined with each other and indies indicating the effects of the respective combinations of measures.

The risk value calculation means 13 calculates a risk value of an attack route under the assumption that the measure(s) planned by the measure calculation means 12 is introduced into the system to be analyzed. The risk value calculation means 13 calculates the risk value based on an index indicating the effect of the measure included in the planned measure and an index indicating the effect of the combination of measures included in the planned measure.

In the present disclosure, the measure compatibility table 16 includes, for each combination of measures, an index indicating the effect of the combination. The measure calculation means 12 plans measures by using the measure candidate table 15 and the measure compatibility table 16. In the present disclosure, for some combinations of measures, measures can be planned by using indices indicating effects contained (i.e., listed) in the measure compatibility table 16. Therefore, the first information processing apparatus 10 can plan a plurality of measures introduced into the system without increasing the amount of calculation.

Figure 2:
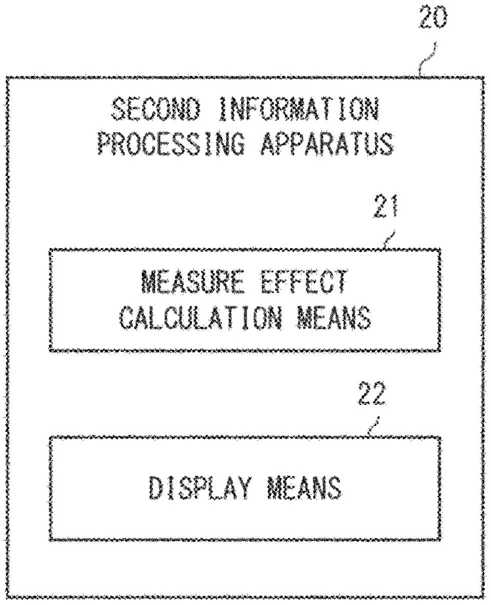
FIG. 2 is a block diagram showing a schematic configuration of an information processing apparatus according to another aspect of the present disclosure.

Next, a second information processing apparatus according to the present disclosure will be described. FIG. 2 schematically shows the second information processing apparatus. The second information processing apparatus 20 includes measure effect calculation means 21 and display means 22. The second information processing apparatus 20 can function as an apparatus that visualizes effects of security measures. The measure effect calculation means 21 calculates, for each of attack routes included in the result of a risk analysis on a system to be analyzed, an effect of a planned measure(s) under the assumption that the planned measure(s) is introduced into the system to be analyzed. The display means 22 displays the calculated effect of the measure(s) in association with the risk value of the attack route.

In the present disclosure, the second information processing apparatus 20 displays the effect of the measure against the attack route in association with the risk value of the attack route. For example, the second information processing apparatus 20 shows, for the user, the result including the effect of the measure(s), rather than displaying only the risk value after the measure(s) is introduced, in a table format. In this way, the user can check the effect of the planned measure(s) and the risk value.

Figure 3:
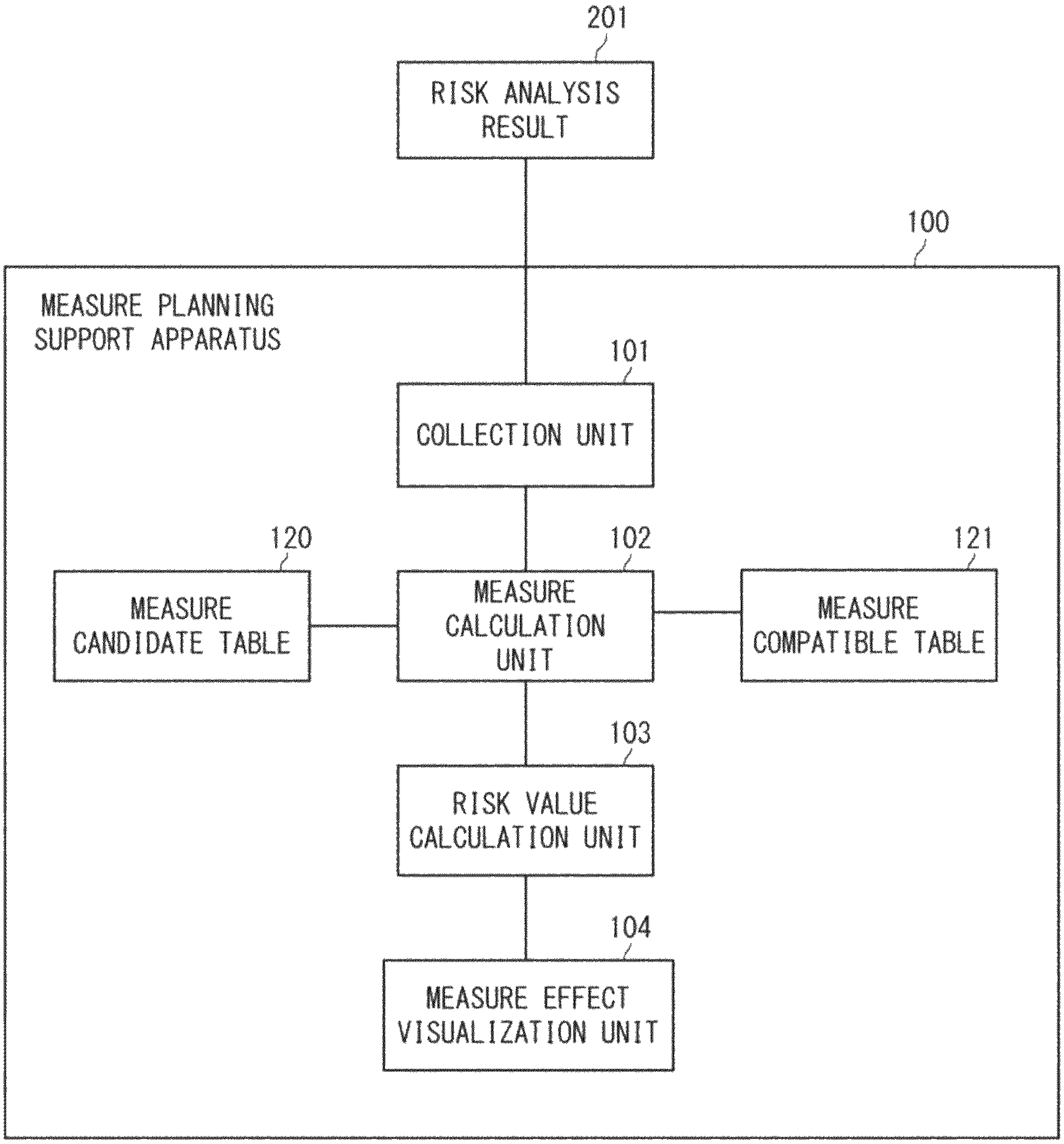
FIG. 3 is a block diagram showing an information processing apparatus according to an example embodiment of the present disclosure.

An example embodiment according to the present disclosure will be described hereinafter in detail. FIG. 3 shows a first information processing apparatus according to an example embodiment of the present disclosure. In this example embodiment, the first information processing apparatus may also be called a measure planning support apparatus. The measure planning support apparatus 100 includes a collection unit 101, a measure calculation unit 102, a risk value calculation unit 103, and a measure effect visualization unit 104. The measure planning support apparatus 100 includes, for example, at least one memory and at least one processor. At least some of the functions of the various units in the measure planning support apparatus 100 can be implemented by having a processor operate according to a program read from the memory.

A risk analysis result 201 of a system of which the risk is analyzed is input to the measure planning support apparatus 100. The collection unit 101 acquires the risk analysis result 201. The risk analysis result 201 includes attack routes. Note that the "attack route" refers to, for example, a route that an attacker follows (i.e., uses) when he/she attacks the final attack target by using a certain asset (e.g., a certain apparatus or the like) as an entry point. The attack route is also called an attack tree. Further, the "attack" also refers to, for example, an operation that is maliciously carried out on such an asset. Examples of attacks includes "data tampering", an "unauthorized operation", and a "DoS (Denial-of-Service) attack". The attack route includes at least one attack step. Each attack step includes an attack source, an attack target, and an attack. A risk analysis is performed by, for example, creating a virtual model from information about the configuration of the real environment, generating attack routes according to attack scenarios to be analyzed, and calculating a risk value for each of the attack routes. The risk analysis may be performed manually or by using a risk analyzer. The collection unit 101 corresponds to the analysis result acquisition means 11 shown in FIG. 1.

A measure candidate table 120 is a table containing (i.e., listing) a plurality of measures (candidates thereof) that can be introduced against attacks and indices indicating the effects of the respective measures. Note that the "measure" indicates a security measure for preventing an attack or reducing damage caused by an attack. A measure compatibility table 121 is a table containing (i.e., listing) combinations of measures in each of which two or more of the plurality of measures that can be introduced against attacks are combined with each other and indies indicating the effects of the respective combinations of measures. The measure calculation unit 102 plans measures against attacks used in attack routes included in the risk analysis result 201 by using the measure candidate table 120 and the measure compatibility table 121. The measure calculation unit 102 plans, for each of a plurality of attack routes included in the risk analysis result 201, a measure(s) against an attack used in that attack route.

FIG. 4 shows an example of the measure candidate table 120. The measure candidate table 120 holds a plurality of measures as measures (candidates thereof) that can be introduced into the system or the like. The measure candidate table 120 holds "Attack means against which measure is effective", "Effect", and "Priority" for each of measures A to E which are measure candidates. "Attack means against which measure is effective" indicates against which attack the measure is introduced. "Effect" and "Priority" are indices indicating the effect of the measure under the assumption that it is introduced. "Effect" indicates the magnitude of the effect of the measure under the assumption that it is introduced. "Priority" is set according to the effect of the measure and the cost of the implementation thereof under the assumption that it is introduced. For example, for a given measure, "Priority" is set to a value smaller than that of "Effect" when the effect of the measure is large but the cost of the implementation thereof is high. Each of "Effect" and "Priority" is represented by, for example, a real number between 0 and 1 (inclusive).

FIG. 5 shows an example of the measure compatibility table 121. The measure compatibility table 121 is a table holding, for each combination of two or more measures which overlap one another or have limitations, information about, for example, whether they can be combined with each other, the effect of the combination, and the priority of the combination. In the example shown in FIG. 5, for example, it is defined that measures A and B can be combined with each other, and measures A and D cannot be combined with each other. The measure compatibility table 121 does not necessarily have to include information about whether they can be combined with each other. For example, "Effect =0" may be defined as a combination of measures that cannot be combined with each other.

In FIG. 5, "Effect" and "Priority" are indices indicating the effects of combinations of measures under the assumption that they are introduced. "Effect" indicates the magnitudes of the effects of combinations of measures under the assumption that they are introduced. "Priority" is set according to the effect of the combination of measures and the cost of the implementation thereof under the assumption that it is introduced. For example, for a given combination of measures, "Priority" is set to a value smaller than that of "Effect" when the effect of the combination is large but the cost of the implementation of one of the measures of the combination is high under the assumption that it is introduced. For combinations of measures that are not contained in the measure compatibility table 121, there are no overlap among the effects of measures and no limitation for the combinations.

Figures 6, 7:
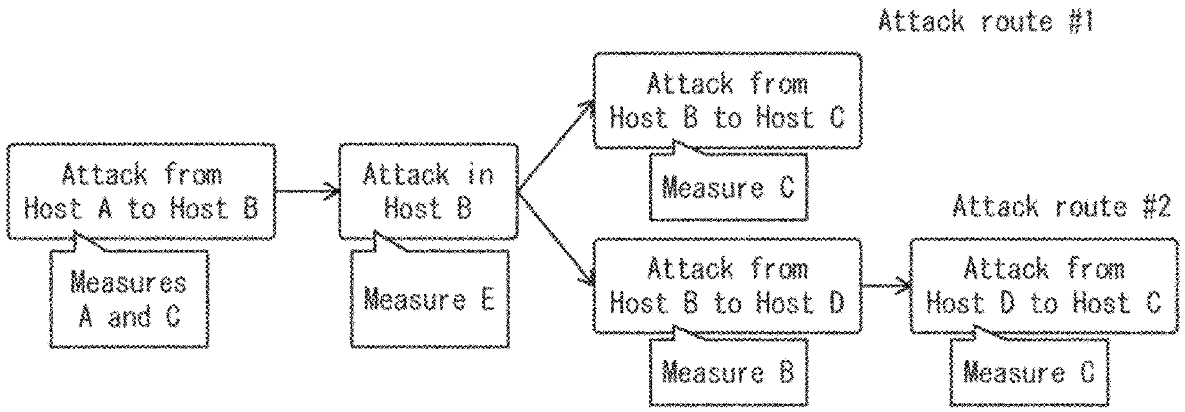
FIG. 6 shows another example of a measure compatibility table.
FIG. 7 is a schematic diagram schematically showing how to plan measures.

Note that it is considered that depending on the area where the system to be analyzed is installed and the type of the system to be analyzed, measures that can be introduced, combinations of measures that can be introduced, the effects of measures, and priorities of measures may change. At least one of the measure candidate table 120 and the measure compatibility table 121 may hold such information for each condition of the system. FIG. 6 shows another example of the measure compatibility table 121. In this example, the measure compatibility table 121 includes areas of the system to be analyzed. The measure compatibility table 121 holds effects of combinations of measures, priorities, and whether combinations are possible or not for a case where the system to be analyzed is the system of a "Factory". Further, the measure compatibility table 121 holds effects of combinations of measures, priorities, and whether combinations are possible or not for a case where the system to be analyzed is the system of an "Office". As shown in this example, the measure compatibility table 121 may hold information defined for each area.

Regarding the planning of measures, the measure calculation unit 102 plans a plurality of measures. The measure calculation unit 102 selects a first measure based on the indices indicating the effects of measures contained (i.e., listed) in the measure candidate table 120. In the following description, it is assumed that the measure calculation unit 102 refers to the priority as an index indicating the effect. For example, the measure calculation unit 102 selects, in the measure candidate table 120, a measure having the highest priority among the measures effective against the attack means used in the attack as the first measure. The measure calculation unit 102 selects second and subsequent measures based on at least either the priorities contained (i.e., listed) in the measure candidate table 120 or the priorities contained (i.e., listed) in the measure compatibility table 121.

For example, in the selecting of the second and subsequent measures, the measure calculation unit 102 successively selects, among the plurality of measures effective against the attack means, those that have not been selected yet and checks, for each of the selected measures, whether or not a combination of that measure with at least one measure that has already been selected is contained (i.e., listed) in the measure compatibility table 121. As shown in FIG. 6, when the measure compatibility table 121 has information as to whether combinations are possible or not for each area, the measure calculation unit 102 refers to information corresponding to the area of the system to be analyzed and thereby checks whether the above-described combination is contained in the measure compatibility table 121.

When the combination is contained in the measure compatibility table 121, the measure calculation unit 102 uses the priority of the combination of measures contained in the measure compatibility table 121 as the priority of the selected measure under the assumption that it is introduced. When the combination is not contained (i.e., not listed) in the measure compatibility table 121, the measure calculation unit 102 uses the priority of the measure contained (i.e., listed) in the measure candidate table 120 as the priority of the selected measure under the assumption that it is introduced. When the combination is "not possible" in the measure compatibility table 121, the measure calculation unit 102 does not include the selected measure in the measures to be planned. The measure calculation unit 102 corresponds to the measure calculation means 12 shown in FIG. 1. The measure candidate table 120 corresponds to the measure candidate table 15 shown in FIG. 1. The measure compatibility table 121 corresponds to the measure compatibility table 16 shown in FIG. 1.

The risk value calculation unit 103 calculates the risk value of the attack route under the assumption that the measure(s) planned by the measure calculation unit 102 are introduced into the system to be analyzed. The risk value indicates the degree of damage that the attack inflicts on the system. The risk value calculation unit 103 acquires the priority of the measure or the combination of measures from at least one of the measure candidate table 120 and the measure compatibility table 121, and calculates the risk value based on the acquired priority. The risk value calculation unit 103 acquires, for example, the priority from the measure compatibility table 121 for, among the measures included in the planned measures, the combination of measures contained in the measure compatibility table 121. The risk value calculation unit 103 acquires the priority from the measure candidate table 120 for, among the measures included in the planned measures, the measure contained in the measure compatibility table 121.

The risk value calculation unit 103 calculates the risk value, for example, every time a measure is added to the measures planned by the measure calculation unit 102. The measure calculation unit 102 adds a measure until the risk value calculated by the risk value calculation unit 103 decreases beyond a predetermined criterion. The risk value calculation unit 103 corresponds to the risk value calculation means 13 shown in FIG. 1.

The measure effect visualization unit (measure effect visualization means) 104 displays the risk of the attack route including the effects of the measures on a display screen of a display device (not shown). The measure effect visualization unit 104 shows, for the user, the risk of the attack route including not only the risk value but also the effects of the measures in a table format.

For example, the measure effect visualization unit 104 calculates, for each attack route, the effects of planned measures under the assumption that they are introduced into the system or the like. For example, the measure effect visualization unit 104 calculates the sum total of the priorities of the measures included in the planned measures and the priorities of the combinations of measures included in the planned measures as the effect of the measures. Alternatively, the measure effect visualization unit 104 calculates the sum total of the measures included in the planned measures as the effect of the measures. The measure effect visualization unit 104 displays the calculated effect of the measures in association with the risk value of the attack route. For example, the measure effect visualization unit 104 may divide the effect of measures into a plurality of sections and display, for each of the sections of the effect of measures, the number of attack routes corresponding to that section and the risk value in a table format.

Note that it is sufficient if the measure candidate table 120 and the measure compatibility table 121 can be accessed from the measure planning support apparatus 100, and do not necessarily have to be included in the measure planning support apparatus 100. For example, at least one of the measure candidate table 120 and the measure compatibility table 121 may be disposed on a cloud system, and the measure planning support apparatus 100 may access the measure candidate table 120 and the measure compatibility table 121 disposed on the cloud system through a network.

Further, in this example embodiment, the measure effect visualization unit 104 do not necessarily have to be included in the measure planning support apparatus 100. The measure effect visualization unit 104 may be formed as an independent apparatus different from the measure planning support apparatus 100. The measure effect visualization unit 104 may be formed as an apparatus including at least one memory and at least one processor. The functions of the measure effect visualization unit 104 can be implemented by having a processor operate according to a program read from the memory. The functions of the measure effect visualization unit 104 are not necessarily limited to the displaying of the risks of attack routes including effects of measures planned by the measure calculation unit 102, calculated under the assumption that they are introduced into the system or the like. The measure effect visualization unit 104 can display the risks of attack routes including effects of measures planned by an arbitrary method, calculated under the assumption that they are introduced into the system or the like. The measure effect visualization unit 104 can correspond to the second information processing apparatus 20 shown in FIG. 2.

A specific example will be described hereinafter. FIG. 7 schematically shows how to plan measures. In FIG. 7, two attack routes #1 and #2 of both of which the entry point of the attack is a host A and the final attack target is a host C. In the selecting of a first measure, the measure calculation unit 102 refers to the measure candidate table 120 and selects a measure(s) against an attack step used in the attack route. For example, the measure calculation unit 102 refers to the measure candidate table 120 shown in FIG. 4 and selects a measure A having the highest priority "0.4" as the first measure. In the attack routes #1 and #2 shown in FIG. 7, the measure A is introduced against the attack step from the host A to the host B. The risk value calculation unit 103 calculates the risk value under that assumption that the measure A is introduced. When the risk value is still lower than a predetermined threshold even after the measure A is introduced, the measure calculation unit 102 selects an additional measure (i.e., another measure).

In the selecting of a second measure, the measure calculation unit 102 successively selects measures contained in the measure candidate table 120 that have not been selected yet one by one. The measure calculation unit 102 selects a measure B and checks whether a combination of the already selected measure A and the measure B is contained (i.e., listed) in the measure compatibility table 121. In the measure compatibility table 121 shown in FIG. 5, there is a combination of the measures A and B, and its priority is "0.5". Next, the measure calculation unit 102 selects a measure C and checks whether a combination of the already selected measure A and the measure C is contained in the measure compatibility table 121. In the measure compatibility table 121 shown in FIG. 5, there is a combination of the measures A and C, and its priority is "0.7"

The measure calculation unit 102 selects a measure D and checks whether a combination of the measures A and D is contained in the measure compatibility table 121. In the measure compatibility table 121 shown in FIG. 5, a combination of the measures A and D is not possible. In this case, the measure calculation unit 102 excludes the measure D from the planned measures. The measure calculation unit 102 also checks, for a measure E, whether a combination of the measures A and E is contained in the measure compatibility table 121. A combination of the measures A and E is not contained in the measure compatibility table 121 shown in FIG. 5. In this case, the measure calculation unit 102 acquires the priority (0.25) of the measure E from the measure candidate table 120 shown in FIG. 4.

The measure calculation unit 102 compares the priorities of the acquired measures B, C and E with one another. In the above-described example, the measure C has the highest priority. In this case, the measure calculation unit 102 selects the measure C as the second measure. In the attack routes #1 and #2 shown in FIG. 7, the measure C is introduced against the attack step from the host A to the host B, the attack step from the host B to the host C, and the attack step from the host D to the host C. The risk value calculation unit 103 calculates a risk value under the assumption that the measure C is introduced into the system or the like. When the risk value is still lower than the predetermined threshold even after the measure C is introduced, the measure calculation unit 102 selects an additional measure (i.e., another measure). The measure calculation unit 102 repeats the addition of a measure until the risk value becomes equal to or higher than the predetermined threshold. When the risk value becomes equal to or higher than the predetermined threshold, the measure calculation unit 102 finishes the planning of measures.

Figure 8:
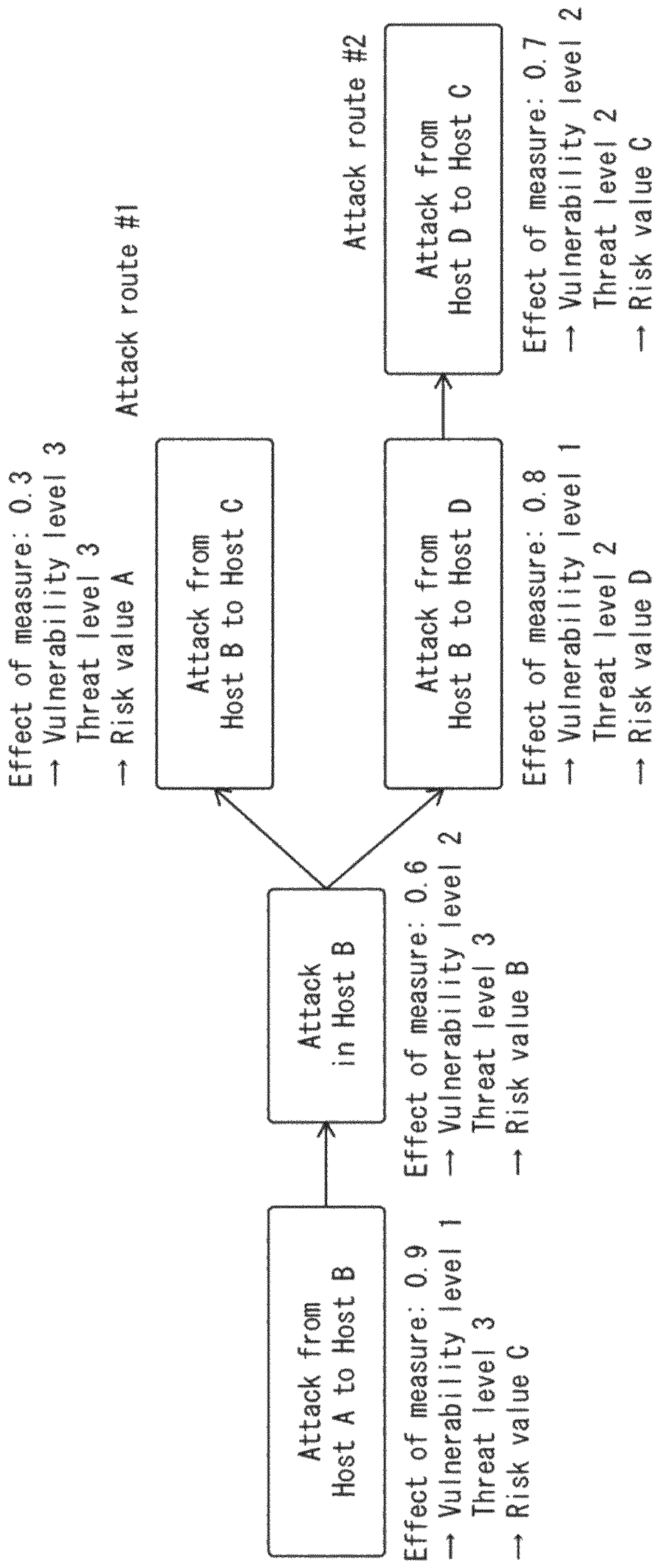
FIG. 8 is a schematic diagram schematically showing calculation of risk values.

Next, the calculation of risk values will be described. FIG. 8 schematically shows the calculation of risk values. In FIG. 8, two attack routes #1 and #2 of both of which the entry point of the attack is a host A and the final attack target is a host B. In the example shown in FIG. 8, the effect (priority) of the measure for the attack step from the host A to the host B is set to 0.9; the effect of the measure for the attack step from the host B to the host B is set to 0.6; and the effect of the measure for the attack step from the host B to the host C is set to 0.3. Further, the effect of the measure for the attack step from the host B to the host D is set to 0.8, and effect of the measure for the attack step from the host D to the host C is set to 0.7. The effect of the measure for each attack step is calculated based on the priority contained in the measure candidate table 120 and the priority contained in the measure compatibility table.

The risk value calculation unit 103 calculates a risk value for each of attack steps included in the attack route. As an example, the risk value calculation unit 103 calculates the risk value based on the business damage level, the threat level, and the vulnerability level of the attack step. The business damage level and the threat level may be included in, for example, the risk analysis result 201. Assume that each of the business damage level and the threat level has, for example, three levels from Level 1 to Level 3. The risk value calculation unit 103 determines the risk value, for example, according to the combination of the business damage level with the product of the threat level and the vulnerability level.

For example, the risk value calculation unit 103 converts the effect of a measure into a vulnerability level according to the value thereof. In this example, it is assumed that the vulnerability level has three levels from Level 1 to Level 3. The risk value calculation unit 103 sets the vulnerability level to Level 1 when, for example, the effect of the measure is 0.8 or higher. The risk value calculation unit 103 sets the vulnerability level to Level 2 when the effect of the measure is 0.5 or higher and lower than 0.8. The risk value calculation unit 103 sets the vulnerability level to Level 3 when the effect of the measure is lower than 0.5. For example, for the attack step from the host A to the host B, the risk value calculation unit 103 sets the vulnerability level to Level 1 because the effect of the measure for this attack step is 0.9.

Figures 9, 10:
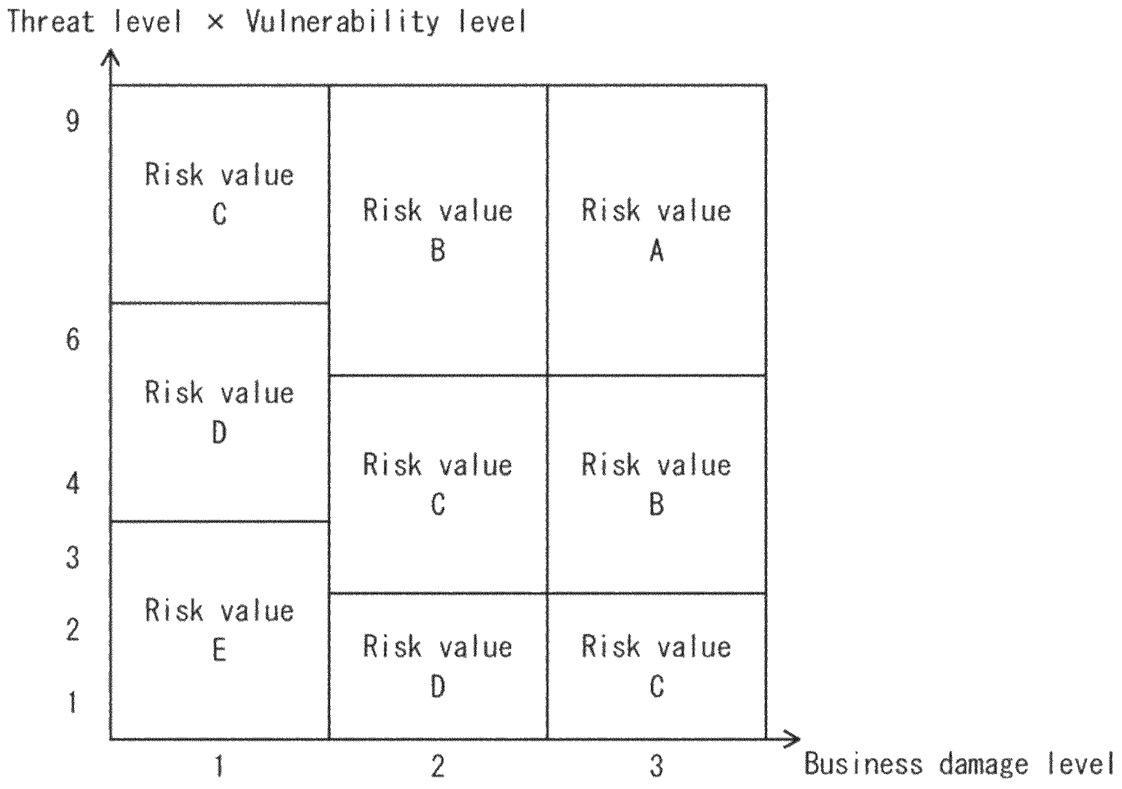
FIG. 9 shows a map used to determine risk values.
FIG. 10 shows an example of displayed attack route risks including effects of measures.

FIG. 9 shows a map used to determine a risk value. In FIG. 9, the horizontal axis indicates the business damage level and the vertical axis indicates the product of the threat level and the vulnerability level. Assume that the risk value A represents the highest risk and the risk value E represents the lowest risk. The risk value calculation unit 103 calculates the risk value of each attack step by using, for example, the map shown in FIG. 9. Assume that, for example, for the attack step from the host A to the host B, the vulnerability level is Level 1; the threat level is Level 3; and the business damage level is Level 2. In that case, the risk value calculation unit 103 determines that the risk value of the attack step from the host A to the host B is the risk value C.

The risk value calculation unit 103 determines the risk value of the attack route from the calculated risk values for the respective attack steps. The risk value calculation unit 103 determines, for example, the risk value of the lowest risk among the risk values of the attack steps included in the attack route as the risk value of the attack route. This is because in order to establish the attack route, the attacker needs to succeed in the attack step having the lowest risk value, in other words, needs to succeed in the most difficult attack. In the example shown in FIG. 9, the risk value calculation unit 103 determines the risk value of the attack route #1 is the risk value C. For the attack route #2, the risk value calculation unit 103 determines the risk value is the risk value D. The method for determining a risk value is not limited to the above-described method, and the risk value calculation unit 103 may determine a risk value by using a method different from the above-described method.

FIG. 10 shows an example of displayed risk values of attack routes including effects of measures. The measure effect visualization unit 104 calculates the total value of effects (priorities) of measures for each attack route. For example, for the attack route #1 shown in FIG. 9, the measure effect visualization unit 104 calculates as expressed as 0.9+0.6+0.3=1.8 as the total value of effects of measures of the attack route #1. For example, the measure effect visualization unit 104 drops the fractional portion of the total value of effects of measures, and thereby converts it into an integer. The measure effect visualization unit 104 divides the effects of the measures into five sections of 0, 1, 2, 3, and 4 or greater (4+). The measure effect visualization unit 104 counts, for each combination of a section (an integer value) of the effect of the measure and a risk value, the number of attack routes for that combination. The measure effect visualization unit 104 displays the counted numbers of attack routes in a table format as shown in FIG. 10.

The measure effect visualization unit 104 may calculate the number of measures introduced in the attack route, instead of calculating the total value of effects of measures in the attack route. In that case, the measure effect visualization unit 104 may divide, for example, the numbers of measures into a plurality of sections such as a section from 0 or greater to less than 2, a section from 2 or greater to less than 4, and a section of 4 or greater, and display the number of attack routes for each risk value and for each section in a table format.

A user who plans security measures can recognize a distribution of risk values of attack routes by referring to the table shown in FIG. 10. Further, the user can also recognize the number of attack routes for each risk value and for each effect of a measure. By referring to the table shown in FIG. 10, the user can recognize, for example, for high-risk attack routes, the number of attack routes in which an effective measure(s) is introduced and the number of attack routes in which no effective measure has been introduced. Further, the user can also recognize how many attack routes of which risks are high but in which no measure has been introduced or the introduced measure is not sufficiently effective are present.

Figure 11:
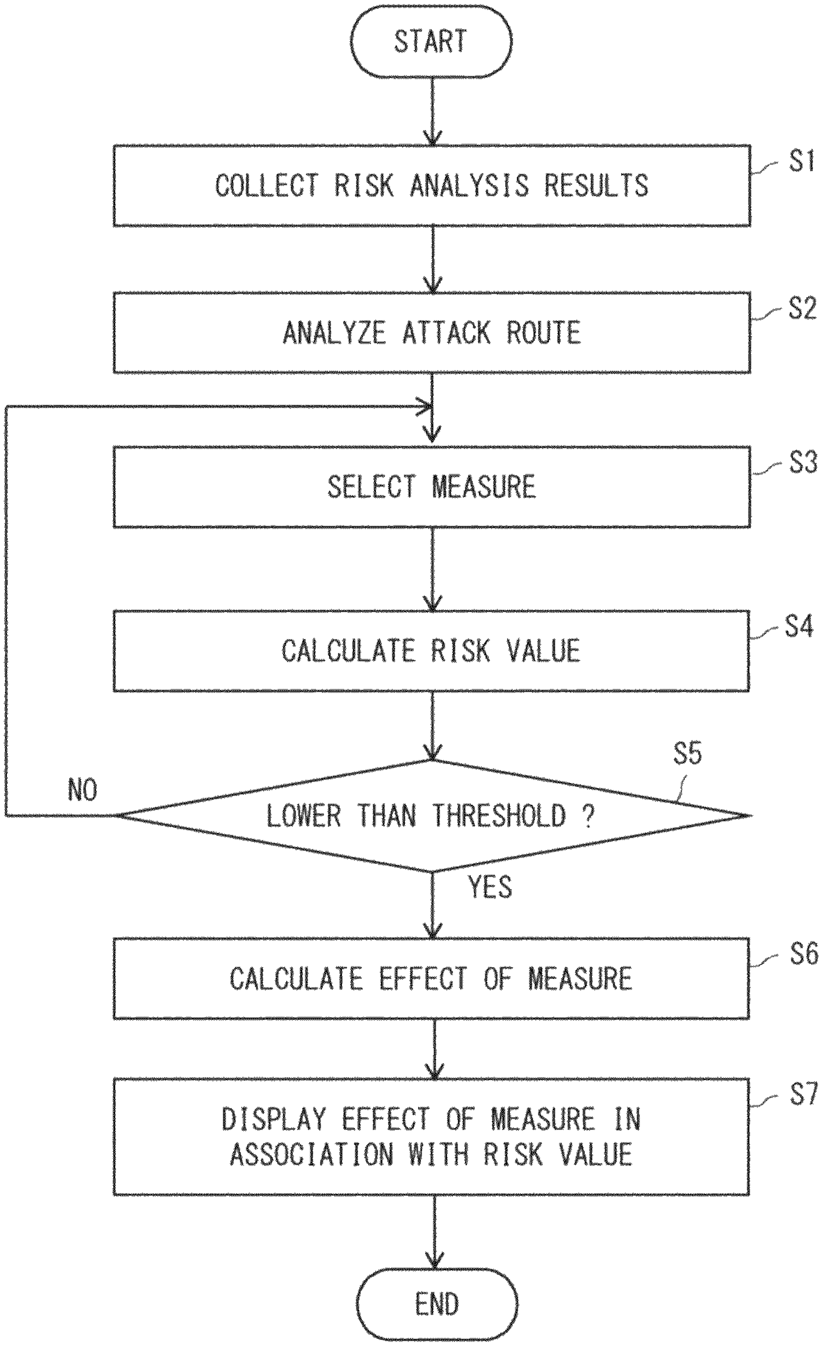
FIG. 11 is a flowchart showing an operating procedure performed by a measure planning support apparatus.

Next, an operating procedure will be described. FIG. 11 shows an operating procedure (information processing method) performed by the measure planning support apparatus 100. The collection unit 101 acquires a risk analysis result 201 (Step S1). The measure calculation unit 102 analyzes an attack route and specifies a vulnerability(ies) that could be used in an attack (Step S2). The measure calculation unit 102 selects a measure(s) against the attack (Step S3).

In the selecting of a first measure, the measure calculation unit 102 refers to the measure candidate table 120 and selects a measure(s) against the attack step used in the attack route based on the priority.

The risk value calculation unit 103 calculates a risk value under the assumption that the measure(s) selected in the step S3 is introduced into the system to be analyzed (Step S4). The measure calculation unit 102 determines whether the risk value calculated in the step S4 is lower than a predetermined threshold (Step S5). When the measure calculation unit 102 determines that the risk value is lower than the threshold in the step S5, it returns to the step S3 and selects an additional measure (i.e., another measure). In the adding of a second measure or a measure subsequent thereto, the measure calculation unit 102 selects an additional measure while giving consideration to the compatibility with the already selected measure by using the measure candidate table 120 and the measure compatibility table 121.

When the measure calculation unit 102 determines that the risk value is equal to or higher than the predetermined threshold in the step S5, it finishes the planning of measures. The measure effect visualization unit 104 calculates the effect (priority) of the measures and their combinations included in the planned measures for each attack route (Step S6). In the step S6, the measure effect visualization unit 104 calculates, for example, the total value of priorities for each attack route.

The measure effect visualization unit 104 displays the calculated effect of the measures in association with the risk value of the attack route (Step S7). In the step S7, for example, the measure calculation unit 102 divides the effect of measures into a plurality of sections and display, for each of the sections of the effect of measures, the number of attack routes corresponding to that section and the risk value in a table format. The steps S6 and S7 correspond to the operating procedure (information processing method) performed by the measure effect visualization unit 104.

In this example embodiment, the measure compatibility table 121 holds information about, for example, the effects or the priorities of measures and whether or not combinations are possible for specific combinations of measures. In the planning of measures, the measure calculation unit 102 selects a first measure by referring to the measure candidate table 120. In the selecting of a second measure or a measure subsequent thereto, the measure calculation unit 102 selects a measure to be added by referring to the measure candidate table 120 and the measure compatibility table 121. In this example embodiment, for a combination of measures, the effect or the priority of the measure is acquired from the measure compatibility table 121. In this example embodiment, the measure calculation unit 102 does not need to comprehensively calculate the effect under the assumption that the measure(s) is introduced into the system or the like for each of all the combinations, and can plan measures in which a plurality of measures are combined with each other with a small amount of calculation.

In this example embodiment, it is sufficient if the measure compatibility table 121 holds the effects or priorities of measures for several combinations of measures, and whether or not combinations are possible. That is, the measure compatibility table 121 does not need to hold the effects or priorities for all the combinations of measures. In regard to the combinations of measures that are not contained in the measure compatibility table 121, the measure calculation unit 102 can select an additional measure(s) from the measure candidate table 120 under the assumption that there is no overlap among the effects of measures and no limitation for the combinations. In this example embodiment, it is possible to, for combinations of measures for which the overlap of effects and whether combinations are possible have been found out, successively add information thereabout in the measure compatibility table 121. In that case, the measure calculation unit 102 can plan measures by using the measure compatibility table 121, in which such information have been added, while giving consideration to newly found-out overlap of effects and whether combinations are possible.

Figure 12:
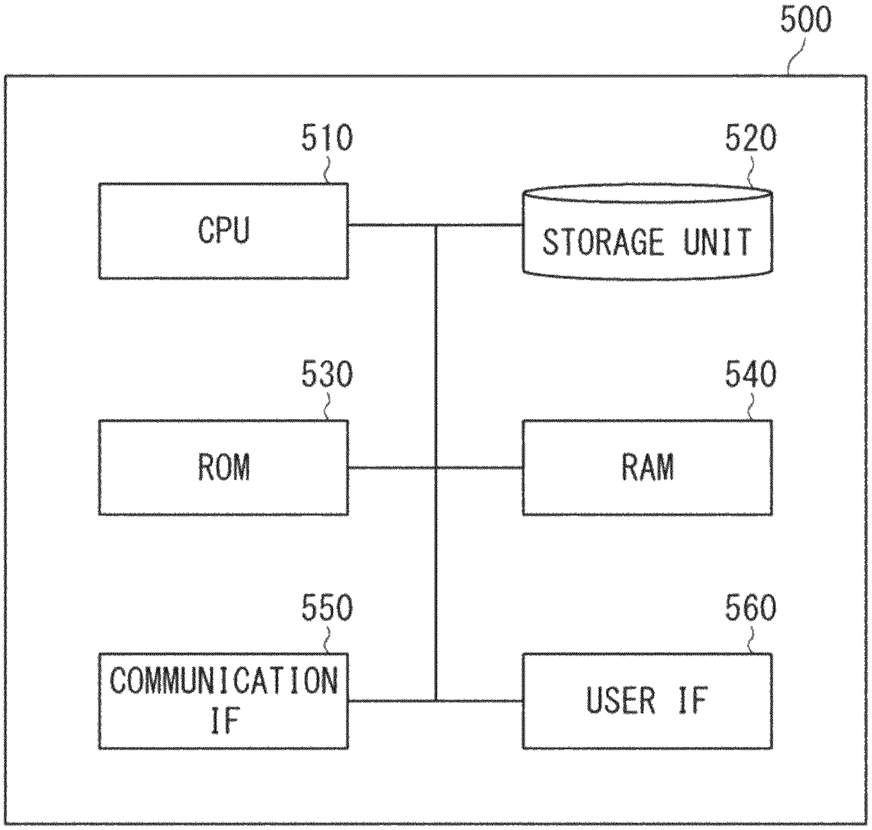
FIG. 12 is a block diagram showing an example of a configuration of a computer apparatus.

Next, a physical configuration of the measure planning support apparatus 100 will be described. FIG. 12 shows an example of a configuration of a computer apparatus that can be used as the measure planning support apparatus 100. A computer apparatus 500 includes a control unit (CPU: Central Processing Unit) 510, a storage unit 520, a ROM (Read Only Memory) 530, a RAM (Random Access Memory) 540, a communication interface (IF: Interface) 550, and a user interface (IF) 560. The computer apparatus 500 may be used as the measure effect visualization unit 104.

The communication interface 550 is an interface for connecting the computer apparatus 500 to a communication network through wired communication means or wireless communication means or the like. The user interface 560 includes, for example, a display unit such as a display device. Further, the user interface 560 includes an input unit such as a keyboard, a mouse, and a touch panel.

The storage unit 520 is an auxiliary storage device that can hold various types of data. The storage unit 520 does not necessarily have to be a part of the computer apparatus 500, but may be an external storage device, or a cloud storage connected to the computer apparatus 500 through a network. The storage unit 520 may be used, for example, to store at least one of the measure candidate table 120 and the measure compatibility table 121 shown in FIG. 2.

The ROM 530 is a non-volatile storage device. For example, a semiconductor storage device such as a flash memory having a relatively small capacity can be used for the ROM 530. A program(s) that is executed by the CPU 510 may be stored in the storage unit 520 or the ROM 530. The storage unit 520 or the ROM 530 stores, for example, various programs for implementing the function of each unit in the measure planning support apparatus 100.

In the above-described examples, the program includes a set of instructions (or software codes) that, when read into a computer, causes the computer to perform one or more of the functions described in the example embodiments. The program may be stored in a non-transitory computer readable medium or in a physical storage medium. By way of example rather than limitation, a computer readable medium or a physical storage medium may include a RAM, a ROM, a flash memory, a solid-state drive (SSD), or other memory technology, a Compact Disc (CD), a digital versatile disc (DVD), Blu-ray (Registered Trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

The RAM 540 is a volatile storage device. As the RAM 540, various types of semiconductor memory apparatuses such as a DRAM (Dynamic Random Access Memory) or an SRAM (Static Random Access Memory) can be used. The RAM 540 can be used as an internal buffer for temporarily storing data and the like. The CPU 510 expands (i.e., loads) a program stored in the storage unit 520 or the ROM 530 in the RAM 540, and executes the expanded (i.e., loaded) program. The function of each unit in the measure planning support apparatus 100 can be implemented by having the CPU 510 execute a program. The CPU 510 may include an internal buffer in which data and the like can be temporarily stored.

Although example embodiments according to the present disclosure have been described above in detail, the present disclosure is not limited to the above-described example embodiments, and the present disclosure also includes those that are obtained by making changes or modifications to the above-described example embodiments without departing from the scope of the present disclosure.

The whole or part of the example embodiments disclosed above can be described as, but not limited to, the following Supplementary notes.

[Supplementary Note 1]

An information processing apparatus including:

analysis result acquisition means for acquiring a result of a risk analysis on a system to be analyzed, including an attack route;

measure calculation means for planning a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and risk value calculation means for calculating, based on an index indicating an effect of a measure included in the planned measure and an index indicating an effect of a combination of measures included in the planned measure, a risk value of the attack route under an assumption that the planned measure is introduced into the system to be analyzed.

[Supplementary Note 2]

The information processing apparatus described in Supplementary note 1, wherein the measure calculation means selects a first measure based on an index indicating an effect of a measure contained in the measure candidate table, and selects second and subsequent measures based on at least one of an effect of a measure contained in the measure candidate table and an effect of a combination of measures contained in the measure compatibility table.

[Supplementary Note 3]

The information processing apparatus described in Supplementary note 2, wherein in the selecting of the second and subsequent measures, the measure calculation means successively selects, among the plurality of measures, measures that have not been selected yet, checks whether or not a combination of the selected measure with at least one measure that has already been selected is contained in the measure compatibility table, and when the combination is included therein, uses an index indicating an effect of the combination of measures contained in the measure compatibility table as an index indicating an effect that is obtained under the assumption that the selected measures are introduced into the system to be analyzed.

[Supplementary Note 4]

The information processing apparatus described in Supplementary note 3, wherein when no combination of the selected measure with at least one measure that has already been selected is contained in the measure compatibility table, the measure calculation means uses an index indicating an effect of a measure contained in the measure candidate table as an index indicating an effect that is obtained under the assumption that the selected measure is introduced into the system to be analyzed.

[Supplementary Note 5]

The information processing apparatus described in Supplementary note 3 or 4, wherein the measure compatibility table further contains information indicating whether or not a combination of two or more measures is possible, and when information indicating that no combination of the selected measure with at least one measure that has already been selected is possible is contained in the measure compatibility table, the measure calculation means does not include the selected measure in the planned measures.

[Supplementary Note 6]

The information processing apparatus described in any one of Supplementary notes 1 to 5, wherein the index indicating the effect of the combination is set according to an effect of the combination of measures and a cost of implementation thereof.

[Supplementary Note 7]

The information processing apparatus described in any one of Supplementary notes 1 to 5, wherein the measure calculation means adds a measure until the calculated risk value decreases beyond a predetermined criterion.

[Supplementary Note 8]

The information processing apparatus described in any one of Supplementary notes 1 to 7, further including measure effect visualization means for, for each attack route, calculating an effect of the planned measure under an assumption that the planned measure is introduced into the system to be analyzed and displaying the calculated effect of the measure in association with a risk value of the attack route.

[Supplementary Note 9]

The information processing apparatus described in Supplementary note 8, wherein the measure effect visualization means calculates, as the effect of the measures, a sum total of an index indicating the effect of the measure included in the planned measures and an index indicating the effect of the combination included in the planned measures, or a sum total of the measures included in the planned measures.

[Supplementary Note 10]

The information processing apparatus described in Supplementary note 8 or 9, wherein the measure effect visualization means divides the effect of the measures into a plurality of sections and display, for each of the sections of the effect of the measures, the number of attack routes corresponding to that section and the risk value.

[Supplementary Note 11]

An information processing apparatus including:

measure effect calculation means for calculating, for each of attack routes included in a result of a risk analysis on a system to be analyzed, an effect of a planned measure under an assumption that the planned measure is introduced into the system to be analyzed; and display means for displaying the calculated effect of the measure in association with a risk value of the attack route.

[Supplementary Note 12]

The information processing apparatus described in Supplementary note 11, wherein the measure effect calculation means calculates, as the effect of the measures, a sum total of an index indicating an effect of the measure included in the planned measures contained in a measure candidate table containing a plurality of measures that can be introduced against an attack and indices indicating effects of respective measures, and an index indicating an effect of a combination of two or more measures of the plurality of measures included in the planned measures contained in a measure compatible table containing combinations of two or more of measures of the plurality of measures and indices indicating effects of respective combinations of measures.

[Supplementary Note 13]

The information processing apparatus described in Supplementary note 11, wherein the measure effect calculation means calculates a sum total of the measures included in the planned measures as the effect of the measures.

[Supplementary Note 14]

The information processing apparatus described in any one of Supplementary notes 11 or 13, wherein the display means divides the effect of the measures into a plurality of sections and display, for each of the sections of the effect of the measures, the number of attack routes corresponding to that section and the risk value.

[Supplementary Note 15]

An information processing method including:

acquiring a result of a risk analysis on a system to be analyzed, including an attack route;

planning a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and calculating, based on an index indicating an effect of a measure included in the planned measure and an index indicating an effect of a combination of measures included in the planned measure, a risk value of the attack route under an assumption that the planned measure is introduced into the system to be analyzed.

[Supplementary Note 16]

An information processing method including:

calculating, for each of attack routes included in a result of a risk analysis on a system to be analyzed, an effect of a planned measure under an assumption that the planned measure is introduced into the system to be analyzed; and displaying the calculated effect of the measure in association with a risk value of the attack route.

[Supplementary Note 17]

A non-transitory computer readable medium storing a program for causing a computer to perform processes including:

acquiring a result of a risk analysis on a system to be analyzed, including an attack route;

planning a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and calculating, based on an index indicating an effect of a measure included in the planned measure and an index indicating an effect of a combination of measures included in the planned measure, a risk value of the attack route under an assumption that the planned measure is introduced into the system to be analyzed.

[Supplementary Note 18]

A non-transitory computer readable medium storing a program for causing a computer to perform processes including:

calculating, for each of attack routes included in a result of a risk analysis on a system to be analyzed, an effect of a planned measure under an assumption that the planned measure is introduced into the system to be analyzed; and displaying the calculated effect of the measure in association with a risk value of the attack route.

REFERENCE SIGNS LIST

10 FIRST INFORMATION PROCESSING APPARATUS

11 ANALYSIS RESULT ACQUISITION MEANS

12 MEASURE CALCULATION MEANS

13 RISK VALUE CALCULATION MEANS

15 MEASURE CANDIDATE TABLE

16 MEASURE COMPATIBILITY TABLE

20 SECOND INFORMATION PROCESSING APPARATUS
21 MEASURE EFFECT CALCULATION MEANS
22 DISPLAY MEANS
100 MEASURE PLANNING SUPPORT APPARATUS
101 COLLECTION UNIT
102 MEASURE CALCULATION UNIT
103 RISK VALUE CALCULATION UNIT
104 MEASURE EFFECT VISUALIZATION UNIT
120 MEASURE CANDIDATE TABLE
121 MEASURE COMPATIBLE TABLE
201 RISK ANALYSIS RESULT
500 COMPUTER APPARATUS
510 CPU
520 STORAGE UNIT
530 ROM
540 RAM
550 COMMUNICATION IF
560 USER IF

The invention claimed is:

1. An information processing apparatus comprising:
at least one memory storing instructions; and
at least one processor configured to execute the instructions to:
acquire a result of a risk analysis on a system to be analyzed, including an attack route;
plan a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and
calculate, based on an index indicating an effect of a measure included in the planned measure and an index indicating an effect of a combination of measures included in the planned measure, a risk value of the attack route under an assumption that the planned measure is introduced into the system to be analyzed,
wherein the at least one processor is configured to execute the instructions to select a first measure based on an index indicating an effect of a measure contained in the measure candidate table, and select second and subsequent measures based on at least one of an effect of a measure contained in the measure candidate table and an effect of a combination of measures contained in the measure compatibility table, and
wherein, in the selecting of the second and subsequent measures, the at least one processor is configured to execute the instructions to select, among the plurality of measures, measures that have not been selected yet, check whether or not a combination of the selected measure with at least one measure that has already been selected is contained in the measure compatibility table, and when the combination is included therein, use an index indicating an effect of the combination of measures contained in the measure compatibility table as an index indicating an effect that is obtained under the assumption that the selected measures are introduced into the system to be analyzed.

2. The information processing apparatus according to claim 1, wherein when no combination of the selected measure with at least one measure that has already been selected is contained in the measure compatibility table, the at least one processor is configured to execute the instructions to use an index indicating an effect of a measure contained in the measure candidate table as an index indicating an effect that is obtained under the assumption that the selected measure is introduced into the system to be analyzed.

3. The information processing apparatus according to claim 1, wherein
the measure compatibility table further contains information indicating whether or not a combination of two or more measures is possible, and
when information indicating that no combination of the selected measure with at least one measure that has already been selected is possible is contained in the measure compatibility table, the at least one processor is configured to execute the instructions to not include the selected measure in the planned measures.

4. The information processing apparatus according to claim 1, wherein the index indicating the effect of the combination is set according to an effect of the combination of measures and a cost of implementation thereof.

5. The information processing apparatus according to claim 1, wherein the at least one processor is configured to execute the instructions to add a measure until the calculated risk value decreases beyond a predetermined criterion.

6. The information processing apparatus according to claim 1, wherein the at least one processor is configured to execute the instructions to calculate, for each attack route, an effect of the planned measure under an assumption that the planned measure is introduced into the system to be analyzed and display the calculated effect of the measure in association with a risk value of the attack route.

7. The information processing apparatus according to claim 6, wherein the at least one processor is configured to execute the instructions to calculate, as the effect of the measures, a sum total of an index indicating the effect of the measure included in the planned measures and an index indicating the effect of the combination included in the planned measures, or a sum total of the measures included in the planned measures.

8. The information processing apparatus according to claim 6, wherein the at least one processor is configured to execute the instructions to divide the effect of the measures into a plurality of sections and display, for each of the sections of the effect of the measures, the number of attack routes corresponding to that section and the risk value.

9. An information processing apparatus comprising:
at least one memory storing instructions; and
at least one processor configured to execute the instructions to:
calculate, for each of attack routes included in a result of a risk analysis on a system to be analyzed, an effect of a planned measure under an assumption that the planned measure is introduced into the system to be analyzed;
calculate, as the effect of the measures, a sum total of an index indicating an effect of the measure included in the planned measures contained in a measure candidate table containing a plurality of measures that can be introduced against an attack and indices indicating effects of respective measures, and an index indicating an effect of a combination of two or more measures of the plurality of measures included in the planned measures contained in a measure compatible table containing combinations of two or more of measures of the plurality of measures and indices indicating effects of respective combinations of measures; and
display the calculated effect of the measure in association with a risk value of the attack route; and wherein a first measure included in the planned measure is selected based on an index indicating an effect of a measure contained in the measure candidate table, and second and subsequent measures included in the planned measure are selected based on at least one of an effect of a measure contained in the measure candidate table and an effect of a combination of measures contained in the measure compatibility table, and in selection of the second and subsequent measures, measures that have not been selected yet among the plurality of measures are selected, whether or not a combination of the selected measure with at least one measure that has already been selected is contained in the measure compatibility table is checked, and when the combination is included therein, an index indicating an effect of the combination of measures contained in the measure compatibility table is used as an index indicating an effect that is obtained under the assumption that the selected measures are introduced into the system to be analyzed.

10. The information processing apparatus according to claim 9, wherein the at least one processor is configured to execute the instructions to calculate a sum total of the measures included in the planned measures as the effect of the measures.

11. The information processing apparatus according to claim 9, wherein the at least one processor is configured to execute the instructions to divide the effect of the measures into a plurality of sections and display, for each of the sections of the effect of the measures, the number of attack routes corresponding to that section and the risk value.

12. An information processing method comprising:

acquiring a result of a risk analysis on a system to be analyzed, including an attack route;

planning a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and calculating, based on an index indicating an effect of a measure included in the planned measure and an index indicating an effect of a combination of measures included in the planned measure, a risk value of the attack route under an assumption that the planned measure is introduced into the system to be analyzed, and wherein the planning the measure includes selecting a first measure based on an index indicating an effect of a measure contained in the measure candidate table, and selecting second and subsequent measures based on at least one of an effect of a measure contained in the measure candidate table and an effect of a combination of measures contained in the measure compatibility table, and wherein the selecting the second and subsequent measures includes selecting, among the plurality of measures, measures that have not been selected yet, checking whether or not a combination of the selected measure with at least one measure that has already been selected is contained in the measure compatibility table, and when the combination is included therein, using an index indicating an effect of the combination of measures contained in the measure compatibility table as an index indicating an effect that is obtained under the assumption that the selected measures are introduced into the system to be analyzed.

13. An information processing method comprising:

calculating, for each of attack routes included in a result of a risk analysis on a system to be analyzed, an effect of a planned measure under an assumption that the planned measure is introduced into the system to be analyzed;

calculating, as the effect of the measures, a sum total of an index indicating an effect of the measure included in the planned measures contained in a measure candidate table containing a plurality of measures that can be introduced against an attack and indices indicating effects of respective measures, and an index indicating an effect of a combination of two or more measures of the plurality of measures included in the planned measures contained in a measure compatible table containing combinations of two or more of measures of the plurality of measures and indices indicating effects of respective combinations of measures; and displaying the calculated effect of the measure in association with a risk value of the attack route, and wherein a first measure included in the planned measure is selected based on an index indicating an effect of a measure contained in the measure candidate table, and second and subsequent measures included in the planned measure are selected based on at least one of an effect of a measure contained in the measure candidate table and an effect of a combination of measures contained in the measure compatibility table, and in selection of the second and subsequent measures, measures that have not been selected yet among the plurality of measures are selected, whether or not a combination of the selected measure with at least one measure that has already been selected is contained in the measure compatibility table is checked, and when the combination is included therein, an index indicating an effect of the combination of measures contained in the measure compatibility table is used as an index indicating an effect that is obtained under the assumption that the selected measures are introduced into the system to be analyzed.

14. A non-transitory computer readable medium storing a program for causing a computer to perform processes including:

acquiring a result of a risk analysis on a system to be analyzed, including an attack route;

planning a measure against an attack used in an attack route by using a measure candidate table containing a plurality of measures that can be introduced against attacks and a plurality of indices indicating effects of respective measures, and a measure compatibility table containing a combination of measures in which two or more of measures are combined with each other and an index indicating an effect of the combination; and calculating, based on an index indicating an effect of a measure included in the planned measure and an index indicating an effect of a combination of measures included in the planned measure, a risk value of the attack route under an assumption that the planned measure is introduced into the system to be analyzed, and wherein the planning the measure includes selecting a first measure based on an index indicating an effect of a measure contained in the measure candidate table, and selecting second and subsequent measures based on at least one of an effect of a measure contained in the measure candidate table and an effect of a combination of measures contained in the measure compatibility table, and wherein the selecting the second and subsequent measures includes selecting, among the plurality of measures, measures that have not been selected yet, checking whether or not a combination of the selected measure with at least one measure that has already been selected is contained in the measure compatibility table, and when the combination is included therein, using an index indicating an effect of the combination of measures contained in the measure compatibility table as an index indicating an effect that is obtained under the assumption that the selected measures are introduced into the system to be analyzed.

15. A non-transitory computer readable medium storing a program for causing a computer to perform processes including:

calculating, for each of attack routes included in a result of a risk analysis on a system to be analyzed, an effect of a planned measure under an assumption that the planned measure is introduced into the system to be analyzed;

calculating, as the effect of the measures, a sum total of an index indicating an effect of the measure included in the planned measures contained in a measure candidate table containing a plurality of measures that can be introduced against an attack and indices indicating effects of respective measures, and an index indicating an effect of a combination of two or more measures of the plurality of measures included in the planned measures contained in a measure compatible table containing combinations of two or more of measures of the plurality of measures and indices indicating effects of respective combinations of measures; and displaying the calculated effect of the measure in association with a risk value of the attack route, and wherein a first measure included in the planned measure is selected based on an index indicating an effect of a measure contained in the measure candidate table, and second and subsequent measures included in the planned measure are selected based on at least one of an effect of a measure contained in the measure candidate table and an effect of a combination of measures contained in the measure compatibility table, and in selection of the second and subsequent measures, measures that have not been selected yet among the plurality of measures are selected, whether or not a combination of the selected measure with at least one measure that has already been selected is contained in the measure compatibility table is checked, and when the combination is included therein, an index indicating an effect of the combination of measures contained in the measure compatibility table is used as an index indicating an effect that is obtained under the assumption that the selected measures are introduced into the system to be analyzed.

* * * * *